United States Patent [19]

Yevick

[11] 4,105,318

[45] Aug. 8, 1978

[54] PINHOLE MICROFICHE RECORDER AND VIEWER

[75] Inventor: George J. Yevick, Leonia, N.J.

[73] Assignee: Izon Corporation, Stamford, Conn.

[21] Appl. No.: 474,795

[22] Filed: May 30, 1974

[51] Int. Cl.² .............................................. G03B 23/08
[52] U.S. Cl. ....................................... 353/120; 353/38
[58] Field of Search ................... 353/30, 38, 120, 122; 350/167, 205, 206

[56] References Cited

U.S. PATENT DOCUMENTS

| 3,332,318 | 7/1967 | Gessel | 353/25 |
| 3,712,724 | 1/1973 | Pratt | 353/25 |
| 3,864,034 | 2/1975 | Yevick | 353/38 |

OTHER PUBLICATIONS

Applied Optics – Pinhole Optics – vol. 10, No. 12, pp. 2763–2767.

Primary Examiner—Harry N. Haroian
Attorney, Agent, or Firm—Thomas J. Greer, Jr.

[57] ABSTRACT

A microfiche having pinholes instead of lenses. The pinholes and thickness of the fiche are of such dimensions that the device functions as in the manner of a pinhole camera.

3 Claims, 4 Drawing Figures

PINHOLE MICROFICHE RECORDER AND VIEWER

This invention relates to the recording and projection of information employing a microfiche. Such devices are known and are described, for example, in U.S. Pat. No. 3,704,068 to Waly and U.S. Pat. No. 3,712,724 to Courtney-Pratt. As illustrated in the Courtney-Pratt patent, and also in my copending application Ser. No. 309,968 for Microfiche and Reader, filed Nov. 28, 1972 now U.S. Pat. No. 3,864,034, the microfiche is formed of a sheet of clear plastic (such as methyl methacrylate) and one surface provided with a plurality of tiny lenses, termed lensettes, in a rectangular array. The lensettes may be separated from each other by opaque portions which function as field stops. The other surface of the microfiche is coated with a photographic emulsion. A coarse mask having apertures, in a congruent rectangular array, is located contiguous to the face of the microfiche having the lensettes. Fiber optic light pipes, of conventional construction, are optically aligned with the coarse openings of the mask. A projection and viewing screen is placed from and parallel to the coarse mask. The region between the coarse mask and the viewing surface are provided with opaque septa which define one cell for each coarse mask opening. With such an arrangement, as defined in my copending application, the device may be used as a camera for recording information. Those photographic emulsion regions beneath each lensette are exposed to form partial images of an object. After development of the film, the device also functions as a projector. The light pipes now rearwardly illuminate the micro images on the emulsion and project them through the microfiche, thence through the openings of the coarse mask, and thence onto the viewing screen for viewing by the human eye.

According to the practice of this invention, the integral lensettes of the microfiche are replaced by pinholes. The pinholes are defined by small openings in an opaque coating on that microfiche side opposite to the side which carries the photographic emulsion. By properly dimensioning the radii of the pinholes and the thickness of the microfiche, it is possible to enjoy the known advantages of a pinhole camera, i.e., no objective lens and perfect focusing at any depth of field. The main thrust of the invention is the recognition that, in the circumstance and condition of microfiche recording and readout of information, a pinhole may be employed in lieu of a lens.

In essence, a pinhole, as Lord Rayleigh pointed out in Phil Mag., 31, 87 (1891) acts or behaves as the best lens, providing certain conditions are met. To understand such a camera, the following is quoted directly from Lord Rayleigh:

"The function of a lens in forming an image is to compensate by its variable thickness the differences in phase which would otherwise exist between secondary waves arriving at the focal point from various parts of the aperture. If we suppose the diameter of the lens ($2r$) to be given, and its focal length ($f$) gradually to increase, these differences of phase at the image of an infinitely distant luminous point diminish with limit. When $f$ attains a certain value, say $f_1$, the extreme error phase to be compensated falls to $\frac{1}{4}\lambda$. Now, as I have shown on a previous occasion, Phil. Mag., Nov. (1879) an extreme error of phase amounting to $\frac{1}{4}\lambda$, or less, produces no appreciable deterioration in the definition; so that from this point onwards the lens is useless, as only improving an image already sensibly as perfect as the aperture admits of. Throughout the operation of increasing the focal length, the resolving power of the instrument, which depends only upon the aperture, remains unchanged; and we thus arrive at the rather startling conclusion that a telescope of any degree of resolving power might be constructed without an object glass, if only there were no limit to the admissible focal length. This last proviso, however, as we shall see, takes away almost all practical importance from the proposition."

To get an idea of the magnitudes of the quantities involved, let us take the case of an aperture of one fifth inch, about that of the pupil of the eye. The distance of $f_1$, which the actual focal length must exceed, is given by $$\sqrt{f_1^2 + r^2} - f_1 = \lambda/4$$

so that (approximately)

$$f_1 = 2r^2/\lambda$$

Thus, if $\lambda = 1/40{,}000$, $r = 1/10$ $$f_1 = 800$$

"The image of the sun thrown on a screen at a distance exceeding 66 feet, through a hole one fifth inch in diameter, is therefore at least as well defined as that seen direct. In practice it would be better defined, as the direct image is far from perfect. If the image on the screen be regarded from a distance $f_1$, it will appear of its natural angular magnitude. Seen from a distance less than $f_1$, it will appear magnified. Inasmuch as the arrangement affords a view of the sun with full definition (corresponding to aperture) and with an increased apparent magnitude, the name of a telescope can hardly be denied it."

The problem of the optimum size of a pinhole was considered by Lord Rayleigh. He states the following:

"If this aperture is too small, the image loses in definition owing to the spreading out of the waves, and on the other hand it is clear that no image can be formed, when the aperture is large. There must therefore be one particular size of the opening which gives the best result. The best result in general is found, when the aperture as seen from the image includes about nine-tenths of the first Fresnal zone, so that if $a$ is the distance of the object, $b$ that of the image from the screen and $r$ the radius of the opening $$r^2(a+b/ab) = 0.9\lambda$$

In essence, then, the theory of the pin-hole camera is explained by the above remarks of Lord Rayleigh. It is undoubtedly the simplest of all optical elements, constituting nothing more than a hole in a screen. However, the theory is most abstruse since no two scientists seem to agree on the exact coefficient multiplying $\lambda$, as evidenced by the following table.

TABLE 1

Comparison of "Optimum Pinhole Radii"
(Taken from J.M. Field, Jr. Jn. of SMPTE, 74, 320, 1965)

| Pinhole Radius | | Reference |
|---|---|---|
| 1. $\sqrt{b\lambda/2}$ | (Petzal Value) | Hardy and Perrin, Principles of Optics pp. 124-126 |
| 2. $\sqrt{1.5}\ \sqrt{b\lambda/2}$ | | E.W.H. Selwyn, Phot. J. 90B, 1950 |

TABLE 1-continued
Comparison of "Optimum Pinhole Radii"
(Taken from J.M. Field, Jr. Jn. of SMPTE, 74, 320, 1965)

| Pinhole Radius | | Reference |
|---|---|---|
| 3. $\sqrt{1.79}$ $\sqrt{b\lambda/2}$ | | Henney and Dudley, Handbook of Process, McGraw Hill |
| 4. $\sqrt{1.8}$ $\sqrt{b\lambda/2}$ | (Lord Rayleigh) | Mack and Martin, Photographic Process, McGraw Hill |
| 5. $\sqrt{2}$ $\sqrt{b\lambda/2}$ | | J. W. Strutt (Lord Rayleigh) Phil. Mag. 31. 87, 1891 |

In TABLE 1, note that the value in reference 4 is identical to Rayleigh's criteria.

From the above, it is also seen that Lord Rayleigh, together with other workers in the optic arts, emphasized the use of a single pinhole as a telescope or a camera. By this invention, however, a multiplicity of pinholes is employed, with each pinhole seeing a tiny portion of the overall field or object, and thereby the intelligence or information obtained in a compact and reduced form.

The use of an individual pinhole as a camera or telescope, instead of the conventional lens, is generally undesirable becaue of the extremely high $f$-number. TABLE II, taken from Hardy and Perrin, Principles of Optics, page 127 (McGraw-Hill), shows several $f$-numbers, using the Petzal value as the appropriate multiplier, where $r$ is pinhole radius, $a$ is distance from pinhole to screen, and $z'$ is radius of the image on the screen:

TABLE II

| r | a | z | z'/a | f-number |
|---|---|---|---|---|
| 0.01 mm | 0.44 mm | 0.02 mm | 1/22 | f/22 |
| 0.10 mm | 4.44 cm | 0.20 mm | 1/222 | f/222 |
| 1.00 mm | 4.44 m | 2.00 mm | 1/2222 | f/2,222 |

It is seen that any value of $a$ beyond 1 mm. yields an $f$-number extremely large. This in turn requires extremely long exposure times which generally prohibit the use of pinholes in most instances. However, if the value of $a$ is reduced enough, as I have discovered is possible in the case of a microfiche, the $f$-number improves. This may be seen by reference to Table III.

TABLE III
CALCULATION OF VARIOUS f-numbers
USING LORD RAYLEIGH'S OPTIMUM VALUE
FOR THE RADIUS OF A PIN-HOLE
($\lambda$ = 5000 A = 0.5 microns)

| a (microns) | a (mils) | r = $\sqrt{0.9\lambda a}$ (microns) | r (mils) | f-numbers = $\frac{a}{2r}$ |
|---|---|---|---|---|
| 12.5 | 0.5 | 2.5 | 0.1 | 2.5 |
| 25 | 1.0 | 3.52 | 0.14 | 3.5 |
| 37.5 | 1.5 | 4.3 | 0.17 | 4.4 |
| 50 | 2 | 4.97 | 0.20 | 5.0 |
| 75 | 3 | 6.1 | 0.25 | 6.1 |
| 100 | 4 | 7.05 | 0.28 | 7.1 |
| 125 | 5 | 7.85 | 0.31 | 8.0 |
| 175 | 7 | 9.3 | 0.37 | 9.4 |
| 250 | 10 | 11.1 | 0.45 | 11.2 |
| 375 | 15 | 13.6 | 0.55 | 13.8 |
| 750 | 30 | 19.2 | 0.77 | 19.5 |

It will be recalled that the definition of $f$-number is $a/2r$. Thus, as the image distance $a$ (the thickness of the microfiche) becomes smaller, the $f$-number likewise becomes smaller.

From a consideration of Table III, and recalling the wave nature of light, it is clear that not all values of the radius of the pinhole are practical. Thus, when the radius $r$ becomes comparable with the wavelength $\lambda$, serious diffraction effects occur. Thus, for $a$ equal to 12.5 microns = 0.5 mil, the radius of the pinhole is approximately 2.5 microns. With such a small opening, the diffraction becomes overwhelming and the pinhole concept ceases to function effectively. Again, from a consideration of TABLE III, a diameter of 10 or 20 microns for the pinhole appears optimum. This would correspond to an $f$-number of 5 which is ample for light gathering purposes. This in turn corresponds to an image distance at 50 microns or approximately 2 mils. In the case of 75 microns, 3 mils image distance, the $f$-number is approximately 6 which is also satisfactory.

IN THE DRAWINGS:

FIG. 2 is a partial perspective view illustrating the arrangement of FIG. L.

Figure 1:
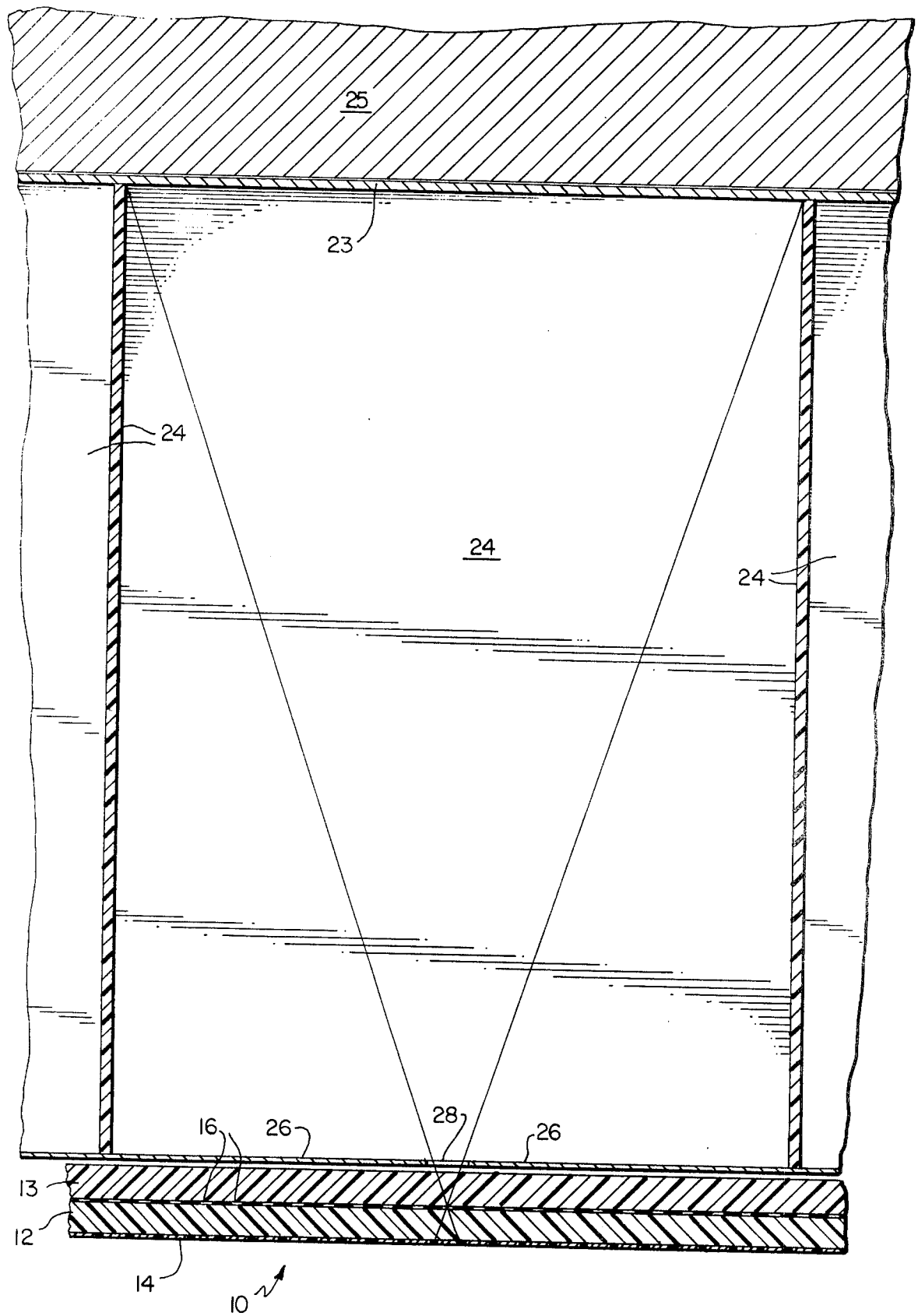
FIG. 1 is a partially schematic section of a recording apparatus employing the pinhole microfiche of this invention.

Referring now to the drawings, the numeral 10 denotes generally the pinhole microfiche of this invention and is defined by a sheet 12 of transparent plastic such as methyl methacrylate. Photographic emulsion 14 is carried by the lower surface and opaque strips 15 in the emulsion are arranged in rows and columns which intersect at 90°. The areas of the emulsion between the opaque portions 15 are adapted to contain intelligence, as will be later more fully understood. The function of the opaque portions 15 is that of field stops. Numeral 16 denotes any one of a plurality of pinholes defined by openings in an opaque coating 18 carried by the top surface of sheet 12. The opaque coating 18 with openings 16 spaced over its surface defines a fine aperture mask on the top surface of the transparent sheet. Numeral 26 denotes a coarse mask defined by an opaque sheet having a plurality of apertures 28 therein. Each aperture 28 is aligned with a pinhole 16. While FIGS. 1 and 2 indicate only a few pinholes 16 between each opening 28, in practice there are approximately 25 pinholes between any pair, vertically or horizontally, of coarse mask openings. This may be more readily visualized from a consideration of FIG. 3 of the drawings which is drawn approximately to scale.

The numeral 24 denotes any one of a plurality of crossed opaque sheets, termed septa, which define a four-sided cell, open at both the top and the bottom, for each opening 28 in the coarse mask. A transparent screen 23 is positioned above the edges of opaque septa 24. In the recording phase, the screen is clear. In the viewing phase, however, the screen 23 must be frosted, as is well known to scatter the light. Numeral 25 schematically denotes a sheet of paper or other master which contains intelligence.

Figure 2:
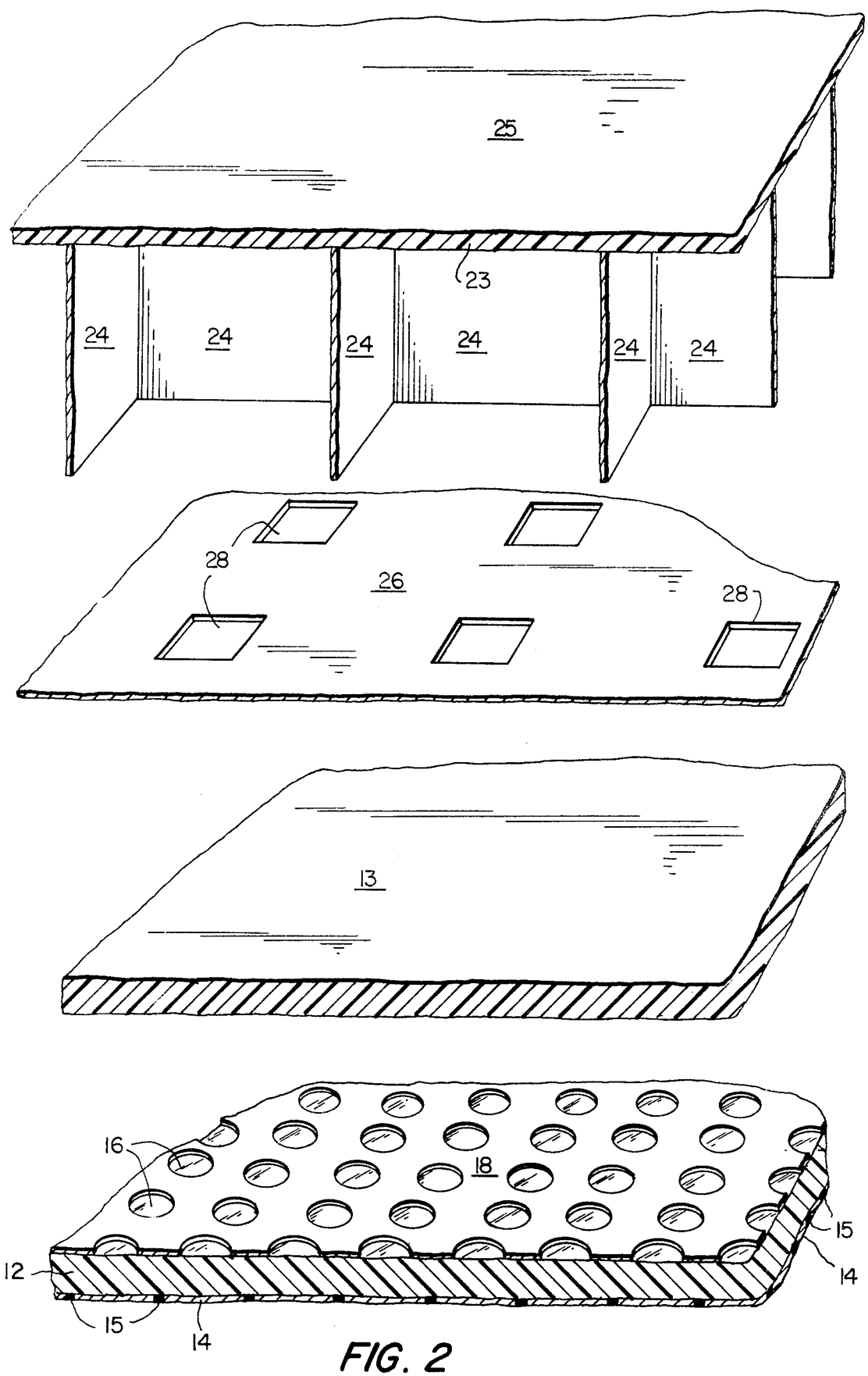
FIG. 2 is a partial perspective view illustrating the arrangement of FIG. 1.
Figure 3:
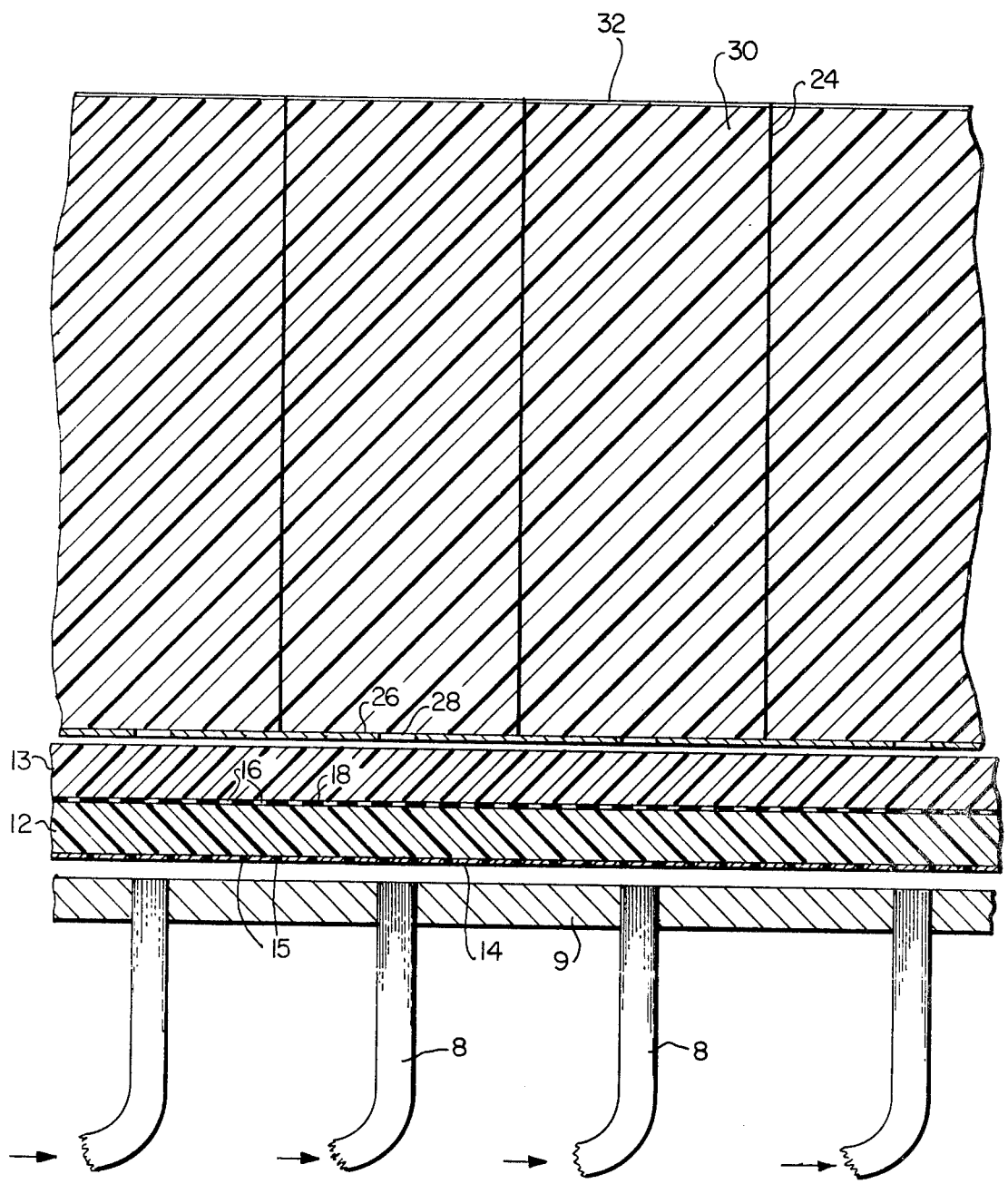
FIG. 3 is a view similar to FIG. 1 drawn to an approximate scale of 5 mils = one inch.

The general mode of operation of the device described at FIGS. 1-3 is as follows:

Light from behind the master 25, which may assume the form of a thin sheet of paper or plastic with printing thereon, passes through clear screen 23, between septa 24 and to the coarse mask openings 28. A pinhole 16 is aligned with each coarse mask opening and, as indicated particularly at FIGS. 1 and 3, the emulsion beneath the corresponding pinhole 16 is activated by the light. The pinholes 16, which are aligned with the coarse mask openings 28, define a first, unique sub-set of all the pinholes 16.

The apparatus is now ready for the next exposure (the next macro scene) and the microfiche 10 is suitably indexed on unit either horizontally, vertically or diagonally so as to align a new and distinct (second) sub-set of pinholes 16 with the (stationary) coarse mask openings 28. The master 25 is again illuminated from the rear and the process repeated. For the third recording operation, the microfiche 10 is again indexed one unit and the process repeated. This continues until all the sub-sets of pinholes 16 of the microfiche are exhausted. The one unit which the microfiche is indexed corresponds to the spacing between pinholes 16. There being a one-to-one correspondence between each pinhole 16 and the photographic emulsion 14 immediately beneath it (and surrounded by opaque strips 15), it is readily seen that all of the emulsion is thus exhausted when the sub-sets of pinholes are exhausted.

The numeral 13 denotes a clear plastic sheet, also, for example, of methyl methacrylate, and of approximately 3 or 4 mils thick (the fiche 12 being of a similar thickness). The purpose of sheet 13 is to provide protection for the pinholes 16 against scratching and dirt as well as provide sufficient mechanical strength to reinforce the microfiche 12. The sheet 13 may be permanently adhered to the microfiche 12, so that the latter may be made extremely thin and thus exhibit a low $f$-number.

For purposes of illustration only, and keeping in mind the broad scope of the pin-hole fiche, typical parameters are as follows (for a square lattice array of pinholes).

| Symbol | Meaning of Symbol | Value of Parameters |
| --- | --- | --- |
| a | Thickness of Pinhole fiche (assumed) | 3 mils |
| 2r | Diameter of Pinholes | 0.5 mils |
| m | Magnification | 25 |
| b | Object Distance | 75 mils |
| $\theta$max | Maxium Angle (assumed) | 20° |
| d | Spacing between Pinholes (center to center) | 2.18 mils |
| D | Spacing between neighboring Micro-Optic Axes | 54.6 mils |
| $2h_1$ | Height of "Object" | 54.6 mils |
| 2h | Height of "Image" (assuming no image stop) | 2.18 mils |
| | Size of aperture of coarse mask | 2.19 mils |
| | Size of masking between neighboring pinholes | 1.68 mils |
| f* | f-number | 6.1 |

The term pin hole refers to an opening whose radius is about nine-tenths of the first Fresnel Zone.

In the viewing or readout stage, the microfiche 12 is photographically developed to fix the optical information on the emulsion and it, together with reinforcing clear plastic sheet 13, are placed in a viewing device as indicated at FIG. 3 of the drawings. The numeral 8 denotes any one of a plurality of light fibers having a total internal reflection and of conventional construction well known to workers in the optic art. The termini of the light pipes 8 are fixedly positioned in supporting plate 9, the latter defining a space with a lower edge of a clear plastic sheet 30 having a viewing screen surface 32. The surface 32 is also frosted to provide light scattering. It will be understood that in lieu of clear plastic plate 30 and viewing surface 32 of a plastic sheet 25, as shown at FIG. 2, for example, and having a frosted surface, may be employed. The coarse mask 26 and corresponding apertures 28 are entirely similar to those illustrated at FIG. 2 of the drawings. Each terminal of light pipe 8 is aligned with a coarse mask opening 28. Again, opaque septa 24 define a four-sided cell corresponding to each coarse opening 28. The input of light pipes 8, not illustrated, is illuminated with any desired source of illumination and beams of light are thus projected rearwardly onto the now fixed photographic emulsion 14 carrying the optical information. The opaque portions 15 in the emulsion function as field stops with respect to the termini of light pipes 8.

The reader will now be in a position to easily comprehend that, for viewing the first recorded scene, the microfiche is suitably indexed so that it is aligned with respect to the openings 28 as indicated at FIG. 3 of the drawings. Each light beam exiting from each terminal 8 strikes one of a first sub-set of emulsion areas 14, the information being projected through pinholes 16 and through the coarse mask openings 28 for final viewing on screen 32 (25). As may be readily visualized from a consideration of FIG. 1 of the drawings, no projection lenses are required because of the natural divergence of the optical information after it passes through the pinholes 16. As was the function of septa 24 in the recording phase, the septa illustrated at FIG. 3 also serves to isolate the various sub-sets of optical information. It will be recalled that in the recording phase, the septa 24 limit for each of the coarse mask openings 28 the field of view for the macro scene being photographed, all for the purpose of preventing cross-talk in the emulsion 14 between different pinholes. In order to view the next cene, the microfiche is now indexed one unit either diagonally, horizontally, or vertically and the process repeated. From which has been previously explained, the reader will appreciate that such second indexing brings a second set of unique, distinct sub-sets of emulsion portions 14 and corresponding pinholes 16 into optical alignment with the coarse mask openings 28. While indexing one unit is the simplest, indexing may be made any number of desired units, so long as all of the subsets are exhausted.

Figure 4:
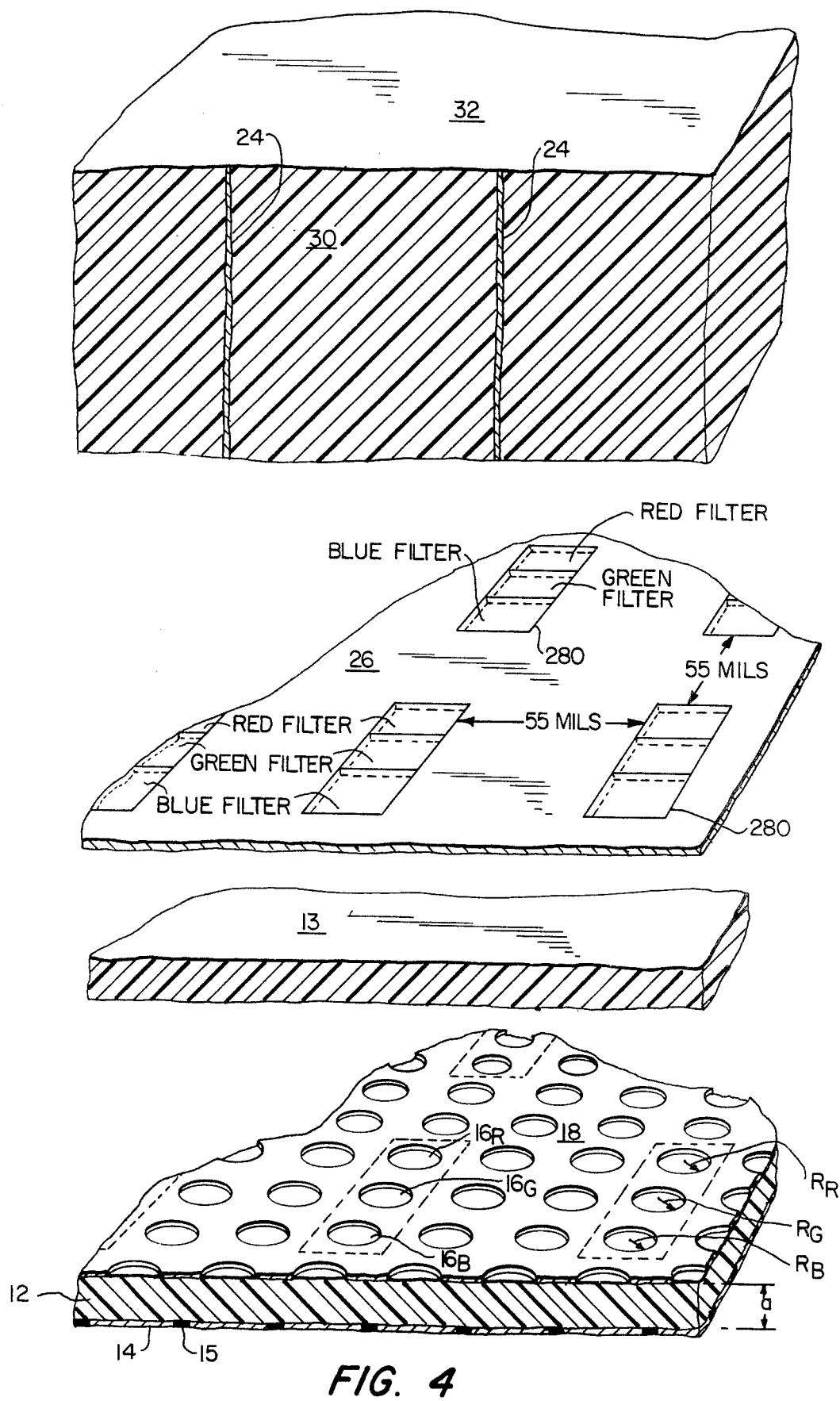
FIG. 4 is a view similar to FIG. 1 and showing an embodiment wherein color photographs may be made.

Referring now to FIG. 4 of the drawings, an embodiment is illustrated wherein color may be recorded and viewed employing pinholes only while using black and white film in lieu of the customary and more expensive color film. Comparing FIGS. 1–3 with the embodiment of FIG. 4, it will be seen that the essential difference is that each of the coarse mask openings 28 has been replaced with a larger opening denoted by the numeral 280, this larger opening carrying the three primary color filters red, green and blue. The color filters 280 are spaced approximately the same distance as openings 280 in the first-described embodiment, namely, approximately 55 mils on the side of the square. Thus, the entire surface of coarse, opaque mask 26 is provided with the three color filters 280 at regions 55 mils apart both horizontally and vertically to thereby define a square grid of filters. When the exploded elements of FIG. 4 are assembled in the final configuration, the red filter is positioned over a pinhole and denoted by $16_R$. The green filter is positioned over a pinhole denoted by $16_G$ while the blue filter is positioned over a pinhole denoted by $16_b$. The radii of the pinholes must vary according to the different wavelengths of the red, green and blue light. For example, assuming the three central wavelengths to be $\lambda_R$, $\lambda_G$, and $\lambda_B$, the respective required radii for the pinholes will be given by the following expressions:

$$R_R = \sqrt{0.9\lambda_R a}$$

$$R_G = \sqrt{0.9\lambda_G a}$$

$$R_B = \sqrt{0.9\lambda_B a}$$

where $R_R > R_G > R_B$

The mode of operation of the embodiment shown at FIG. 4 is as follows.

For the recording phase, the master is a color transparency and is placed on clear sheet 23. Alternatively, if instead of the clear sheet 23 of FIG. 2, a block 30 such as shown at FIG. 3 is employed, the master color transparency is placed on the smooth surface 32. Rearward projection of the master color transparency is now made by a source of light behind it, of any desired type, so long as all wavelengths are represented. From a consideration of FIG. 4, it will be seen that if red only is on the color transparency, then no light will be admitted through the green or blue filters, only the red filter will pass light and the corresponding pinholes $16_R$ will pass light to thereby photographically activate the photographic emulsion 14 directly beneath pinholes $16_R$. Conversely, should the master transparency contain only green light, then the red and blue filters will not pass any light and only the emulsion 14 directly beneath and aligned with pinholes $16_G$ will be activated. The same is true for the case when only blue light is on the master color transparency. In color transparencies more apt to be encountered, as for example a color photograph wherein different regions contain different colors in varying amounts, the septa 24 will break down, as previously explained, the master or macro scene being recorded into sub-scenes, and each color filter set in each of the coarse mask openings 280 will function as abovedescribed, with the result that each sub-set 14 which is defined by a triad of emulsion portions will contain various quantities of light.

In order to record the second color scene of a second macro object, the microfiche is, as in the previously described embodiment, indexed one unit either horizontally, vertically or diagonally, and the process is repeated. After all of the emulsion portions have been exhausted, the emulsion is photographically developed or fixed with the following result. A first sub-set, corresponding to the first macro scene, is defined by a plurality of emulsion portions 14, being a triad of portions corresponding to the areas beneath the several filters. The next or second sub-set which corresponds to the second macro scene which was recorded, will be defined by a second similar sub-set. The reader will readily comprehend that the several sub-sets are entirely analogous to those described with respect to the embodiments of FIGS. 1–3. The essential difference is that each member of each of the sub-sets is now defined by a triad of adjacent images, each member of the triad corresponding to each of the color filters and each of the coarse openings 280.

For viewing or readout, same techniques are employed which were explained with respect to the embodiments of FIGS. 1–3.

The reader will observe that, as indicated above, the radii of the several pinholes corresponding to the different color filters is different. Techniques for making such relatively small differences in radius are well known in, for example, the micro coating art wherein photo etching techniques, widely known, are employed. Accordingly, precise techniques for making these different sizes of pinholes are not given. Similarly, techniques for making the uniform radius pinholes of the embodiment of FIGS. 1–3, together with the methods for the coating 18, are well known and will not be given.

In the viewing or readout phase of the embodiment of FIG. 4, the plate 26 with the color filters in coarse openings 280 may be omitted. In its stead, the contiguous emulsion portions 14 which make up a triad corresponding to the color filters of each opening 280 may be separately illuminated by, for example, light pipes having different colored lights passing through them or by a mirror assemblage employing for example, dichroic mirrors for such separate illumination.

I claim:

1. A microfiche adapted for use on a micro optical viewer, said microfiche including:
   a. a transparent sheet,
   b. one side of said sheet carrying stored micro optical information distributed over its area,
   c. the other surface of said sheet being opaque except for a plurality of pinholes each of which functions as a lens, said pinholes positioned on a plane parallel to said stored information,
   d. said micro optical information defined by a plurality of information sets, each information set corresponding to a unique macro scene, each information set occupying dispersed areas interlaced with but distinct from the dispersed areas occupied by any other information set, each unique macro scene corresponding to a unique set of pinholes, each of the dispersed areas of an information set having its own pinhole and being in optical correspondence therewith, wherein each of the dispersed areas of an information set is itself defined by a triad of spaced-from-each-other optical images, each of said spaced-from-each-other optical images being in optical alignment with a pinhole, each of said pinholes of each said triad being of different radii corresponding to different optical wavelengths.

2. A microfiche adapted for use on a micro optical viewer, said microfiche including:
   a. a transparent sheet,
   b. one side of said sheet carrying stored micro optical information distributed over its area,
   c. the other surface of said sheet being opaque except for a plurality of pinholes each of which functions as a lens, said pinholes positioned on a plane parallel to said stored information,
   d. said micro optical information defined by a plurality of information sets, each information set corresponding to a unique macro scene, each information set occupying dispersed areas interlaced with but distinct from the dispersed areas occupied by any other information set, each unique macro scene corresponding to a unique set of pinholes, each of the dispersed areas of an information set having its own pinhole and being in optical correspondence therewith, wherein the diameter of said pinholes is between 5 and 20 microns.

3. The microfiche of claim 2 wherein the thickness of the microfiche is less than 15 mils.

* * * * *